United States Patent Office 2,989,843
Patented June 27, 1961

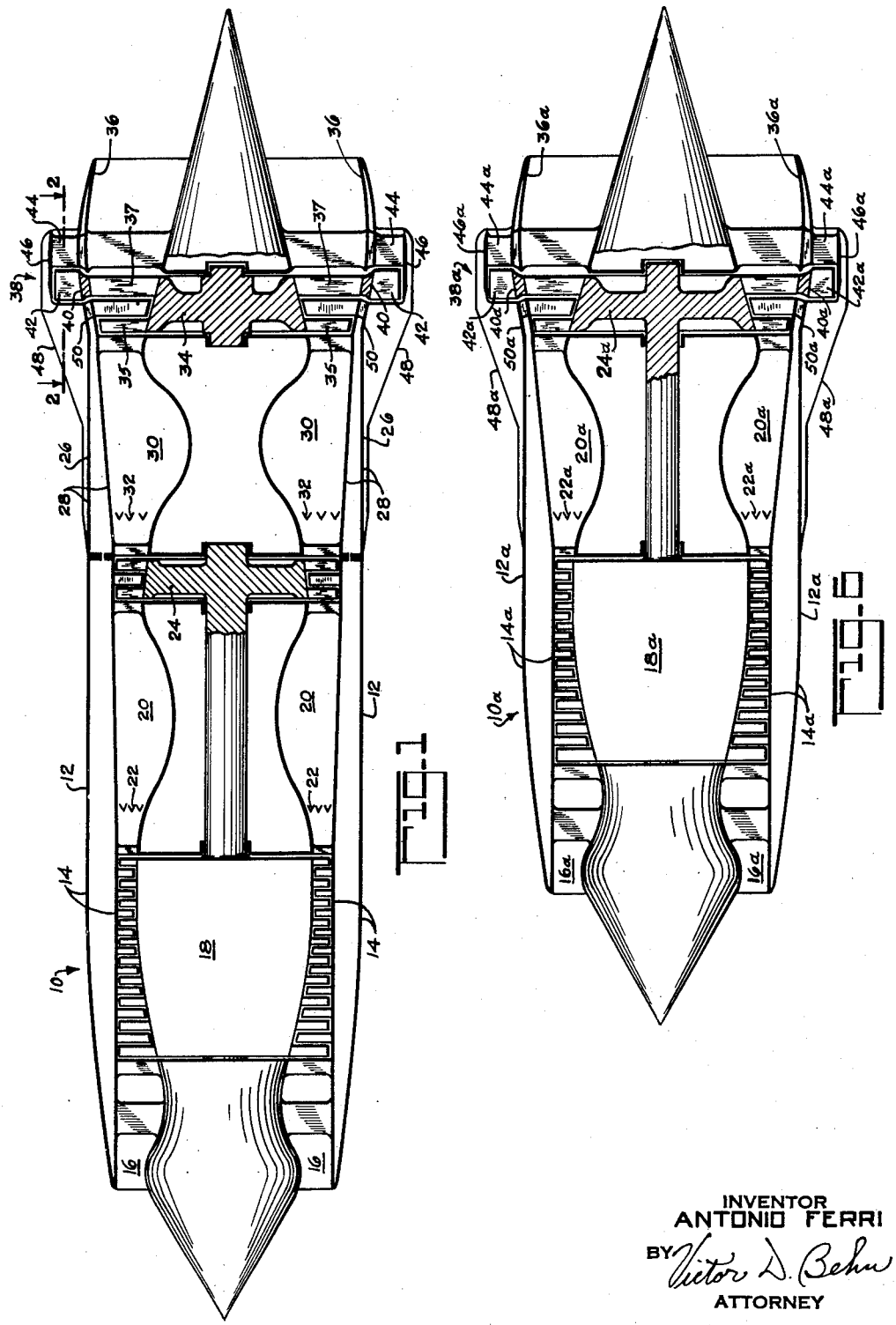

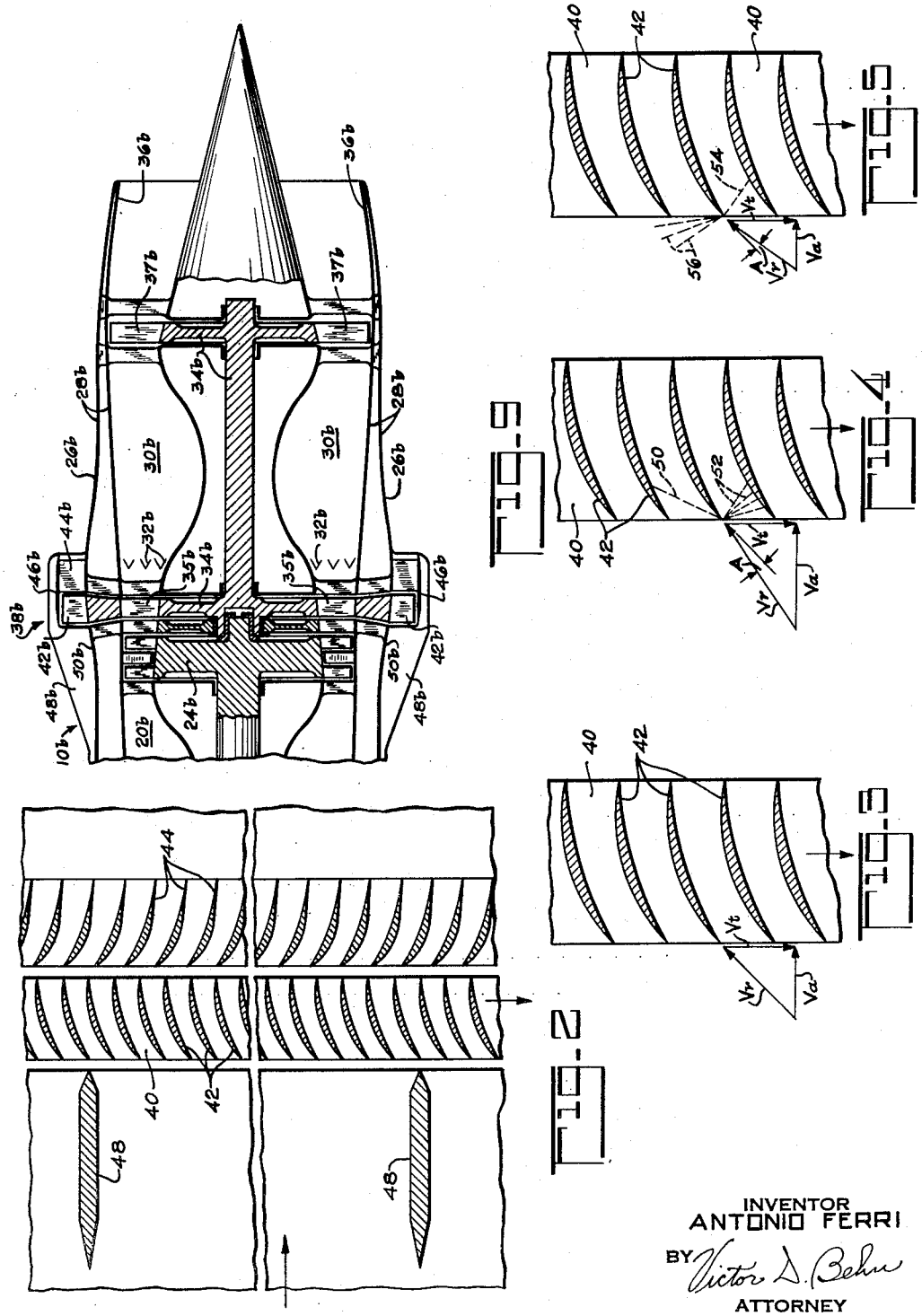

2,989,843
ENGINE FOR SUPERSONIC FLIGHT
Antonio Ferri, Rockville Centre, N.Y., assignor to Curtiss-Wright Corporation, a corporation of Delaware
Filed July 24, 1953, Ser. No. 370,019
2 Claims. (Cl. 60—35.6)

This invention relates to jet engines and is particularly directed to a combined turbo-jet engine and supersonic blower power plant for aircraft.

A conventional turbo-jet engine comprises the combination of an air compressor, a combustion chamber and a turbine drivably connected to the compressor. In such an engine the compressor has a forwardly directed air intake duct and supplies compressed air to the combustion chamber in which energy is added to the air by burning with fuel, the combustion gases driving the turbine and discharging from the turbine rearwardly into the surrounding atmosphere through an exhaust nozzle to provide the engine with forward propulsive thrust. It is also conventional to provide a turbo-jet engine with a second combustion chamber between the turbine and exhaust nozzle for adding additional energy to the turbo-jet gases thereby increasing the engine thrust. Such a second combustion chamber is generally termed an afterburner. The use of an afterburner with a turbo-jet engine, although increasing the thrust output of the engine, results in a substantial increase in the specific fuel consumption (rate of fuel consumption per unit thrust output). An object of the present invention comprises the provision of novel means for increasing the thrust output of a turbo-jet engine at a lower specific fuel consumption than is obtainable with an afterburner. A further object of the invention comprises the provision of a novel turbo-jet and supersonic blower combination. A still further object of the invention comprises the addition to a turbo-jet engine of means for reheating the turbine exhaust gases and utilizing the reheated turbine exhaust gases to drive a turbine and supersonic blower combination.

Other objects of the invention will become apparent upon reading the annexed detailed description in connection with the drawing in which:

FIG. 1 is an axial sectional view through a turbo-jet engine embodying the invention;

FIG. 2 is a developed sectional view taken along line 2—2 of FIG. 1;

FIG. 3 is a diagrammatic view illustrating the air flow conditions immediately upstream of the supersonic blower at the design flight speed and at lower flight speeds;

FIG. 4 is a view similar to FIG. 3 but illustrating said air flow conditions at flight speeds above the design value;

FIG. 5 is a view similar to FIG. 3 but illustrating a transient condition;

FIG. 6 is an axial sectional view similar to FIG. 1 but illustrating a modified construction;

FIG. 9 is an axial sectional view of the aft end of a turbo-jet engine embodying the invention and illustrating a further modified construction.

Figure 7:
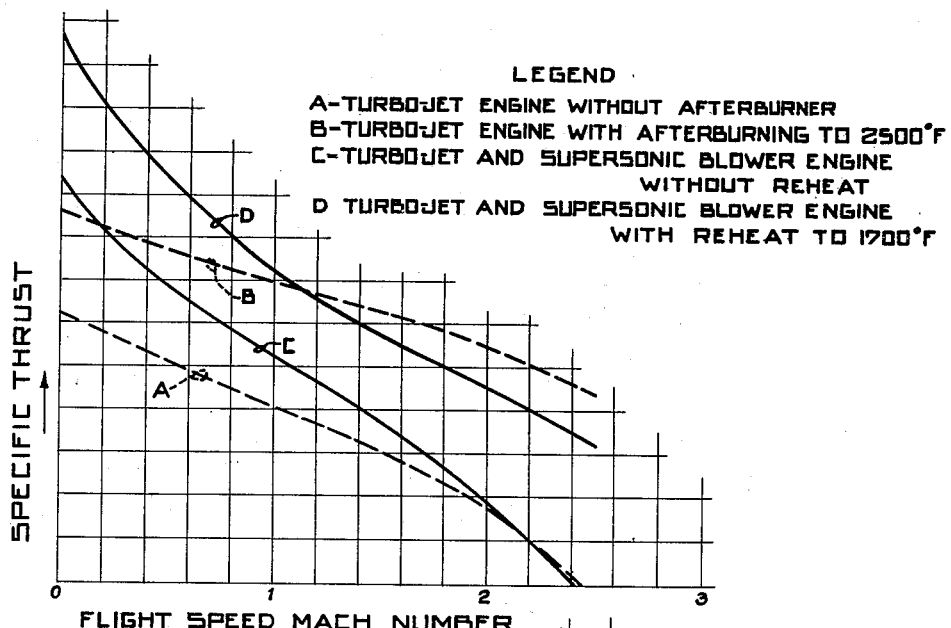
FIGS. 7 and 8 are performance curves comparing the power plant of the present invention with and without reheat with a turbo-jet engine with and without afterburning.

Referring first to FIGS. 1 and 2 of the drawing; there is illustrated an aircraft power plant 10 having a turbo-jet unit 12. The turbo-jet unit 12 includes a housing 14 having a forwardly directed air inlet 16 for a compressor 18 disposed within said housing. The compressor 18 supplies compressed air to a combustion chamber 20 to which fuel is supplied by burner apparatus 22. The gases from said combustion chamber flow between the blades of a turbine 24 for driving said turbine which in turn is drivably connected to the compressor 18. The combustion chamber 20 and turbine 24 are also disposed within the housing 14 along with the compressor 18. The turbo-jet structure described is that of a conventional non-afterburning turbo-jet engine in which the exhaust gases from the turbine discharge therefrom rearwardly through an exhaust nozzle into the surrounding atmosphere to provide the power plant with forward propulsive thrust.

In accordance with the present invention the power plant of FIG. 1 also includes a reheat and supersonic turbo-blower unit 26 which is secured to the rear end of the turbo-jet unit 12 in place of the usual exhaust nozzle structure of a turbo-jet engine. The unit 26 includes a housing 28 secured to the rear end of and forming a continuation of the turbo-jet housing 14. A combustion chamber 30 is disposed within the housing 28 to the rear of the turbine 24 so that the exhaust gases from the turbine 24 discharge into the combustion chamber 30 for reheating said gases. Fuel is supplied to the combustion chamber 30 by burner apparatus 32 for combustion with the excess air in the exhaust gases from the turbine 24. As is conventional in turbo-jet engines the turbo-jet combustion chamber is operated so that there is a substantial amount of excess air in the combustion gases in order to reduce their temperature to a value below the maximum temperature limit for the blades of the turbine 24. The unit 26 also includes a turbine 34 disposed within the housing 28 and arranged to be driven by the reheated gases from the combustion chamber. In the example illustrated, the turbine 34 is a two stage turbine having first stage rotor blades 35 and second stage rotor blades 37. From the turbine 34 the gases discharge rearwardly through a nozzle 36 to provide the power plant with forward propulsive thrust. As is conventional, the exhaust nozzle 36 may be adjustable.

The turbine 34 is rotatable independently of the turbine 24 and a supersonic air blower 38 is driven by the turbine 34. The blower 38 includes an annular member or ring 40 secured across the outer ends of one of the stages of rotor blades of the turbine. If, as illustrated, the turbine 34 is a multistage turbine then the ring 40 preferably is secured across the outer ends of the downstream stage of rotor blades of the turbine 34 because of their lower operating temperature compared to that of the blades of the upstream stage or stages. The ring 40 is substantially flush with the adjacent outer surface of the housing 28 and a plurality of circumferentially-spaced supersonic blower rotor blades 42 are secured to the ring 40 and project radially outwardly therefrom. A plurality of circumferentially-spaced stator blades 44 are secured to the housing 28 rearwardly of the blower rotor blades 42 for substantially straightening out the air flow from the blower rotor blades 42 so that the air flow from the stator blades 44 is substantially axial. An annular shroud 46 is secured about the outer ends of the blower stator blades 44 and said shroud extends forwardly so as to surround the rotor blades 42 to prevent radially outward flow of the air from the inter-blade passages as a result of the high rotative velocity imparted to the air by the rotor blades 42. As illustrated, the shroud 46 extends forwardly only so far that its leading edge does not project any substantial distance upstream of the leading edges of the blower rotor blades 42. This feature is quite important in order that the blower 38 operates efficiently at supersonic flight speeds. Thus if the shroud 46 extended upstream of the blower rotor blades any substantial distance to provide an air inlet duct for the blower 38 then said blower would function as a ducted fan. A ducted fan has the characteristic that for high flight speeds the axial approach velocity in the duct immediately upstream of the fan is substantially lower than the flight velocity whereby a ducted fan would require a larger frontal area to handle the same mass air flow handled by the supersonic blower 38. The supersonic blower 38 is also more efficient than a ducted fan as a thrust producing device because of the air losses inherent in a duct particularly at supersonic flight speeds. Furthermore, like a conventional propeller, the blower 38 does not add to the frontal drag area of the engine whereas if the unit 38 were constructed as a ducted fan it would add to said drag area.

The housing 28, including the nozzle 36 to the rear of the turbine 34, is supported from the forward portion of said housing through the stator blades 44 and shroud 46 by circumferentially spaced webs 48.

The air blower rotor blades 42 preferably are of the impulse type so that they increase the velocity of the air flow through the blower without a substantial increase in the static pressure of said air. In addition, the blower rotor blades 42 are designed so that their leading edges are tangent to the entering air flow at a predetermined or design flight speed. Also the turbine 34 is designed so that throughout the engine flight speed range said turbine can drive the blower 38 at a high enough speed that the linear circumferential velocity of the rotor blades 42 is sufficiently close to or higher than sonic velocity that the Mach No. of the velocity of the air immediately upstream of and relative to the blower rotor blades 42 is always greater than unity. Thus, the power plant 10 can be operated so that the air velocity relative to the rotor blades is always supersonic. Hence the blower rotor blades are provided with sharp leading and trailing edges and the blade faces are designed for efficient handling of supersonic flow without large aerodynamic drag from the blade shock waves.

With the aforedescribed design of the supersonic blower 38 and its turbine 34, said blower efficiently handles all the air approaching the blower, at all flight speeds including take-off up through the transonic speed range to supersonic speeds, without the necessity of a supersonic inlet because the blower regulates automatically the magnitude of the air velocity approaching the blower in an axial direction to the magnitude required by the blower. This can best be seen by reference to FIGS. 3, 4 and 5. In these figures, the vector $V_t$ designates the linear circumferential velocity of the blower rotor blades 42, the vector $V_a$ designates the axial approach velocity of the air immediately upstream of said blades, the vector $V_r$ designates the velocity of said air relative to said blades 42 and A designates the angle of attack of the air on the rotor blades 42. As previously stated since the velocity $V_t$ is always at least close to a velocity of unity Mach No. the relative velocity $V_r$ is always supersonic. At the design flight speed the angle of attack A is assumed to be equal to zero and the Mach No. of the velocity $V_a$ is assumed to be equal to unity. Accordingly, at the design flight speed the relation between the vectors $V_t$, $V_a$ and $V_r$ and the blades 42 is as illustrated in FIG. 3. Since the angle of attack on the blower rotor blades 42 is zero in FIG. 3 no disturbance is created upstream of said blades by the air entering between said blades and hence there is no air spillage over the shroud 46.

At flight speeds higher than the design flight speed, the angle of attack A will generally have some finite value. For example assuming a higher flight speed but with the same rotational velocity of the rotor blades 42 the angle of attack A is negative and the relation between the velocity vectors $V_t$, $V_a$ and $V_r$ and the blades 42 is as illustrated in FIG. 4. Obviously, at higher rotative speeds of the blower blades 42 the angle of attack A may become positive. In FIG. 4, the blades 42 turn the air flow parallel to the blade surfaces thereby forming an oblique shock wave from the nose of each blade on the trailing side of said blade and forming a series of expansion waves 52 from the other or leading side of said blade. Since the axial approach velocity $V_a$ is supersonic in FIG. 4, the shock and expansion waves 50 and 52, respectively, lie entirely within the passages between the blower rotor blades 42 and therefore cause no disturbance upstream of the blower whereby with the conditions of FIG. 4, as with the design conditions, the air enters between the blower blades 42 without air spillage over the shroud 46. This is also true at positive angles of attack resulting from higher blower rotational speeds although for positive angles of attack the positions of the shock and expansion waves of each blade are reversed from their positions at negative angles of attack.

At flight speeds below the design value, that is at subsonic flight speeds, the relation between the vectors $V_t$, $V_a$ and $V_r$ and the blades 42 is also as illustrated in FIG. 3. This can best be understood by referring to FIG. 5. In FIG. 5 the blower blades 42 are assumed to have the same rotative speed as in FIG. 3 and hence the velocity vector $V_t$ in FIG. 5 is the same as in FIG. 3. Assume for the moment that the axial approach velocity $V_a$ is subsonic, as illustrated in FIG. 5. Because of the magnitude of $V_t$ the relative velocity $V_r$ of the air relative to the blades 42 would still be supersonic and would have a positive angle of attack A on said blades. Accordingly with the assumed conditions of FIG. 5 each blade 42 would produce an oblique shock wave 54 on the leading side of said blade and a series of expansion shock waves 56 on the other side. With the assumed conditions of FIG. 5 each shock wave 54 would lie entirely within a passage between a pair of rotor blades 42 but since $V_a$ has been assumed to be subsonic each series of expansion waves 56 would lie ahead or upstream of the rotor blades 42. Furthermore the expansion waves 56 from one blade 42 would extend into the flow approaching the adjacent blade whereby the expansion waves 56 would form a system of overlapping expansion waves in front of the rotor blades 42 which would function to pull in ambient air until air enters the blower rotor blades at a velocity sufficient to satisfy the design condition of FIG. 3 at which the angle of attack A is zero. Thus, FIG. 5 represents only a transient condition existing of subsonic flight speeds when the flight speed or the blower rotational velocity changes and for steady state conditions at subsonic flight speeds the relation between the air flow and the rotor blades 42 is similar to that illustrated in FIG. 3 for the design flight speed at which the axial approach velocity $V_a$ of the air immediately upstream of the blades 42 is at the design supersonic value and the angle of attack A is zero. Accordingly, the mass air flow handled by the blower 38 is high even at low subsonic flight speeds.

From the above analysis of FIGS. 3–5, it is apparent that the blower 38 does not require an intake duct in order to regulate the entering mass air flow and the blower handles large mass air flows from low flight speeds including takeoff up through the transonic speed range to supersonic speeds and therefore said blower is an efficient thrust producer throughout said speeds.

The blower 38 should be distinguished from a conventional aircraft propeller. Thus the angular spacing of the blower rotor blades 42 is sufficiently small relative to the blade chord length that adjacent blower blades in effect form air passages therebetween in that each blade influences the flow over the adjacent blades whereby, for a given blade length, the blades 42 can handle a much larger mass air flow and impart a much larger increase in velocity to the air than the blades of a conventional propeller. For example in a conventional propeller the increase in air velocity produced by the propeller is so low as to render impractical the addition of stator blades behind a propeller for straightening out the air flow. In order to distinguish a blower, such as the blower 38, from a conventional aircraft propeller the term "blower" as used herein is limited to an air-velocity-increasing bladed rotor in which the ratio of the maximum radius of each blower rotor blade to the minimum blade radius is less than 2 and the ratio, midway along the blades, of the linear distance between adjacent blades to the blade chord length is also less than 2. In the case of the blower 38, as illustrated in FIG. 1 the first of these ratios is approximately 1.2 and as illustrated in FIG. 3 the second of these ratios is less than 0.3. It is, however, the intent that, as used in the claims, the term blower shall have its broadest meaning unless otherwise limited therein.

At flight speeds near unity Mach No. the power plant 10 is very efficient because it can be designed to split the thrust between the turbo-jet and the supersonic blower for maximum propulsive efficiency. If, as illustrated, the turbo-jet unit has a supersonic inlet 16 which precompresses the air entering the inlet then at higher flight speeds the mass air flow entering the supersonic blower 38 would decrease with respect to that entering the turbo-jet inlet 16 if means were not provided for precompressing the air approaching the supersonic blower 38 at supersonic flight. For this purpose the portion 50 of the outer surface of the housing 14 immediately upstream of the blower 38, has a conical-like profile which increases in diameter to the leading edges of the rotor blades 42. At supersonic flight speeds the oblique shock wave or the compression waves from the conical-like blower air inlet surface 50 produce precompression of the air before the air enters between the blower rotor blades 38 in much the same manner that precompression is obtained in a conventional conical-nose type supersonic air inlet 16. The slope of the surface 50 is such that, at the design supersonic speed, the oblique shock wave from the upstream end of said surface intersects the leading edge of the shroud 46.

In FIG. 1, the turbo-jet gases are reheated after they exhaust from the turbo-jet unit and the reheated gases drive a second turbine which in turn drives the supersonic blower. FIG. 6 shows a modified arrangement in which the reheat combustion chamber and second turbine are eliminated and the supersonic blower is driven from the turbine of the turbo-jet unit. Except for this difference FIG. 6 is like FIG. 1 and therefore, for convenience of understanding, the elements of FIG. 6 have been designated by the same reference numerals but with a subscript $a$ added thereto as the corresponding elements of FIG. 1.

In FIG. 6, a jet engine power plant 10a includes a turbo-jet unit 12a having a housing 14a, an air inlet 16a, a compressor 18a, a combustion chamber 20a with burner apparatus 22a, and a turbine 24a drivably connected to the compressor 18a and driven by the gases from the combustion chamber 20a. In FIG. 6 the exhaust nozzle 36a is disposed at the rear end of the unit 12a. The power plant 10a also includes a supersonic blower 38a having an annular member 40a secured across the outer ends of the last stage of rotor blades of the turbine 24a. The blower 38a includes a plurality of circumferentially-spaced blades 42a secured to and projecting radially outwardly from the member 40a and said blower also includes a plurality of circumferentially-spaced stator blades 44a disposed downstream of the rotor blades 42a for straightening out the air flow from said rotor blades. In addition, the blower 38a includes an annular shroud 46a surrounding the blower rotor and stator blades with the upstream end of the shroud terminating at the upstream edges of the rotor blades. The shroud 46a and nozzle 36a are supported by webs 48a. In addition, the portion 50a of the power plant housing immediately upstream of the blower 38a has a conical-like profile which increases in diameter to the blower rotor blades 42a so that, at supersonic flight speeds, precompression of the air is obtained before it enters between the rotor blades 42a.

Speed reduction gearing (not shown) may be necessary between the turbine 24a and the blower annular member 40a to prevent the centrifugal forces on the blower rotor blades from becoming excessive. However, as in the case of the blower 38, the blower 48a, is designed so that the linear circumferential velocity of the blower rotor blades 42a is at least close to sonic so that the relative air velocity is supersonic and in addition the leading edges of the blades 42a are designed to be tangent to the entering airflow at a predetermined flight speed. Hence the action of the blower rotor blades 42a on the blower air flow is essentially like that of the blower rotor blades 42 as described in connection with FIGS. 3, 4 and 5.

Turbo-jet engines without an afterburner have low efficiency and low thrust at subsonic speeds. The increase in thrust obtained with an afterburner is at the expense of a large increase in the fuel consumption per pound of thrust. Turbo-jet engines are also used with propellers for increasing their thrust. Such engines are commonly termed turbo-prop engines. In the case of a propeller, however, the aerodynamic losses due to the rotational velocity of the air as it leaves the propeller become quite high at supersonic flight speeds. The stator blades 44 or 44a of applicant's blower reduce such aerodynamic losses by eliminating the rotational velocity of the air discharging from the blower. In addition if a conventional propeller is designed for supersonic flight speeds it is not very efficient at subsonic flight speeds and vice versa. As discussed in connection with FIGS. 3, 4 and 5, however, applicant's supersonic blower can be designed for efficient operation from very slow flight speeds including aircraft take-off up through the transonic range into the supersonic speed range.

Figure 8:
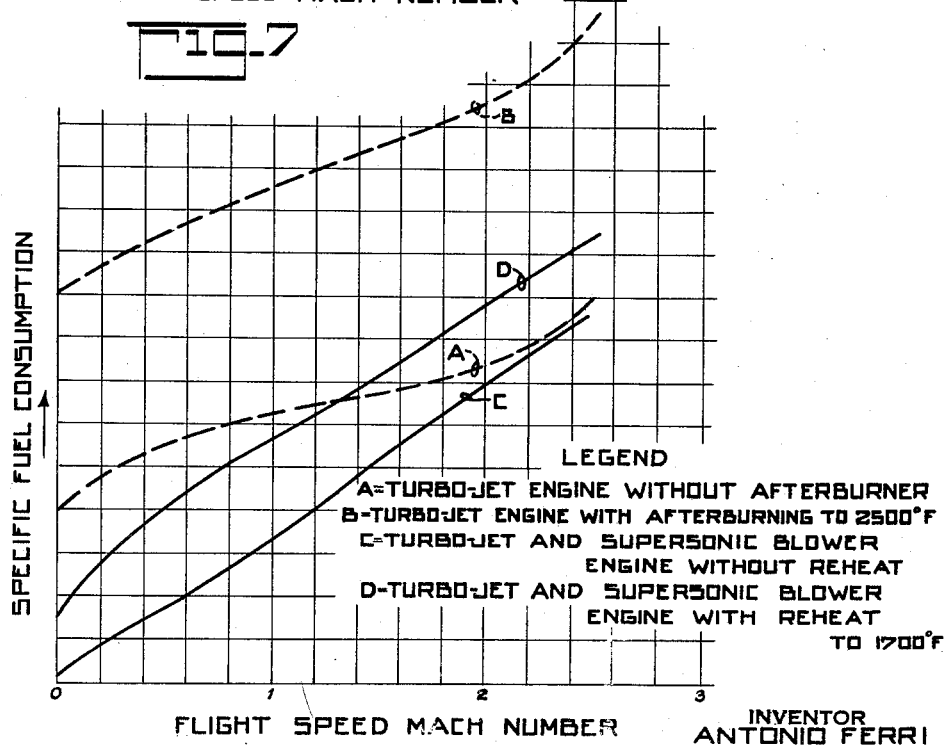

The addition of the blower 38 increases the mass air flow handled by the power plant 10 and therefore a given thrust output can be obtained more efficiently with a lower exhaust velocity than can be obtained with the same turbo-jet unit 12 but with an afterburner in place of the supersonic blower and reheat unit 26. Thus the power plant 10 will operate at a much lower specific fuel consumption (rate of fuel consumption per unit thrust output) than said afterburning turbo-jet. Furthermore, compared to said afterburning turbo-jet, because of the lower specific fuel consumption and increased mass air flow of the power plant 10 a higher specific thrust (thrust per pound of air entering the engine) can be obtained from the power plant 10, particularly at the lower air speeds, with less extra energy consumed in its reheat chamber than in the afterburner of said turbo-jet. Likewise, compared to a non-afterburning turbo-jet, the power plant 10a will operate at a lower specific fuel consumption and a higher specific thrust output can be obtained, particularly at the lower air speeds. This superior performance of the power plants 10 and 10a compared to afterburning and non-afterburning turbo-jets is graphically illustrated by the performance curves of FIGS. 7 and 8 which are based on calculations. Said curves compare applicant's supersonic blower engine without reheat and with reheat to 1700° F. with a conventional turbo-jet engine without afterburning and with afterburning to 2500° F. As is shown in FIG. 7, at high flight speeds the specific thrust of applicant's power plant with reheat at 1700° F. approaches that of a turbo-jet engine with afterburning at 2500° F. while at low flight speeds the specific thrust of applicant's power plant with reheat substantially exceeds that of the afterburning turbo-jet. Furthermore as shown in FIG. 8 the specific fuel consumption of applicant's engine with said reheat not only is less than that of said afterburning turbo-jet throughout the entire flight speed range illustrated (from zero Mach No. to 2.5 Mach No.) but is even less than that of the non-afterburning turbo-jet in the lower speed range. As also illustrated in FIGS. 7 and 8, compared to a turbo-jet without afterburning, applicant's power plant without reheat has a higher specific thrust, particularly in the low speed range, and has a lower specific fuel consumption throughout the speed range.

In the power plant of FIG. 1 the amount of heat energy that can be added to the combustion gases in the reheat combustion chamber 30 is limited by the maximum safe operating temperature of the blades of the turbine 34. FIG. 9 illustrates a modified construction which permits an increase in the amount of heat energy which can be added to the combustion gases in the reheat combustion chamber.

The power plant of FIG. 9 is like that of FIG. 1 except the reheat combustion chamber is interposed between the two stages of rotor blades of the supersonic blower driving turbine. For convenience of understanding, the parts of FIG. 9 have been designated by the same reference numerals but with a subscript *b* added thereto as to the corresponding parts of FIG. 1. Except for the difference noted the power plant 10b of FIG. 9 is like the power plant 10 of FIG. 1. Hence a complete description of FIG. 9 is not necessary.

In FIG. 9, as in FIG. 1, the second turbine 34b is rotatable independently of the turbine 24b but, unlike FIG. 1, in FIG. 9 the first stage blades 35b of the second turbine 34b are disposed immediately downstream of the blades of the turbine 24b. In addition, in FIG. 9, the reheat combustion chamber 30b is disposed between the two stages of rotor blades 35b and 37b of the second turbine. With this arrangement of FIG. 9 the rotor blades 35b take additional energy out of the combustion gases before said gases enter the reheat combustion chamber 30b. Hence, other factors being the same, the gas inlet temperature to the reheat combustion chamber is lower in the power plant 10b of FIG. 9 than it is in the power plant 10 of FIG. 1. Therefore, more heat energy may be added to the gases in the reheat combustion chamber 30b of FIG. 9 before the temperature of the gases discharging from said chamber exceeds the maximum safe operating temperature limit of the rotor blades 37b than can be added in the reheat combustion chamber 30 of FIG. 1 before the temperature of the gases discharging from said latter chamber exceeds the maximum safe operating temperature limit of the rotor blades 35. Thus the construction of FIG. 9 permits a further increase in the specific thrust output of the power plant.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A combination turbo-jet and blower power plant comprising an air compressor; a first combustion chamber to which air is supplied by said compressor; means for supplying fuel to said combustion chamber for combustion therein; a first turbine drivably connected to said compressor and arranged to be driven by gases from said combustion chamber; a second turbine rotatable independently of said first turbine and having a plurality of stages of rotor blades; a second combustion chamber disposed between two of the rotor blade stages of said second turbine, said second turbine and said second combustion chamber being arranged so that the rotor blades of said second turbine upstream of said second combustion chamber receive driving torque from gases exhausting from said first turbine and said second combustion chamber receives the gases exhausting from said upstream rotor blades and the rotor blades of said second turbine downstream of said second combustion chamber receive driving torque from gases of said second chamber; a housing within which said compressor, said first and second combustion chambers and said first and second turbines are disposed, said housing having a discharge passageway communicating with the exhaust side of said second turbine for discharge of the exhaust gases rearwardly into the surrounding atmosphere to provide the power plant with forward propulsive thrust; and an air blower for providing the power plant with additional forward propulsive thrust; said blower comprising an annular rotor member secured across the outer ends of the upstream stage of rotor blades of said second turbine, a plurality of circumferentially-spaced blades secured to said rotor member and projecting outwardly beyond said housing to blow air rearwardly therefrom, and an annular shroud surrounding said rotor blades with the upstream end of said shroud terminating substantially at the upstream edges of said rotor blades.

2. A combination turbo-jet and blower power plant comprising an air compressor; a first combustion chamber to which air is supplied by said compressor; means for supplying fuel to said combustion chamber for combustion therein; a first turbine drivably connected to said compressor and arranged to be driven by gases from said combustion chamber; a second combustion chamber communicating with the exhaust end of said first turbine; means for supplying fuel to said second chamber for combustion therein; a second turbine arranged to receive driving torque from gases of said second combustion chamber, said second turbine being rotatable independently of said first turbine; a housing within which said compressor, said first and second combustion chambers and said first and second turbines are disposed, said housing having an air inlet for said compressor and a discharge passage communicating with the exhaust side of said second turbine for discharge of exhaust gases therethrough rearwardly into the surrounding atmosphere to provide the power plant with forward propulsive thrust; and an air blower for providing the power plant with additional forward thrust; said blower comprising an annular rotor member drivably connected to said second turbine, a plurality of circumferentially-spaced blades secured to said rotor member and projecting outwardly beyond said housing to blow air rearwardly therefrom, and an annular shroud surrounding said rotor blades with the upstream end of said shroud terminating substantially at the upstream edges of said rotor blades, said second turbine having a plurality of stages of rotor blades with at least one of its stages of rotor blades being disposed upstream of said second combustion chamber.

References Cited in the file of this patent

UNITED STATES PATENTS

| Re. 23,639 | Lagelbauer | Mar. 31, 1953 |
| 1,714,917 | Martin | May 28, 1929 |
| 1,802,860 | Zwinkel | Apr. 28, 1931 |
| 2,455,458 | Whittle | Dec. 7, 1948 |
| 2,504,181 | Constant | Apr. 18, 1950 |

FOREIGN PATENTS

| 585,344 | Great Britain | Feb. 5, 1947 |
| 588,096 | Great Britain | May 14, 1947 |